US010185646B2

(12) United States Patent
Pechanec et al.

(10) Patent No.: US 10,185,646 B2
(45) Date of Patent: Jan. 22, 2019

(54) GETTING PERFORMANCE SATURATION POINT OF AN EVENT DRIVEN SYSTEM

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 1511 days.

(21) Appl. No.: 12/336,465

(22) Filed: Dec. 16, 2008

(65) Prior Publication Data
US 2010/0153971 A1 Jun. 17, 2010

(51) Int. Cl.
G06F 9/54 (2006.01)
G06F 11/36 (2006.01)
G06F 11/34 (2006.01)

(52) U.S. Cl.
CPC ...... *G06F 11/3664* (2013.01); *G06F 11/3688* (2013.01); *G06F 11/3409* (2013.01); *G06F 2201/81* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 7,231,425 B1* | 6/2007 | Charny et al. | 709/205 |
| 2003/0076781 A1* | 4/2003 | Enomoto et al. | 370/229 |
| 2003/0163608 A1* | 8/2003 | Tiwary et al. | 710/1 |
| 2003/0229473 A1* | 12/2003 | Gomes et al. | 702/187 |
| 2004/0221261 A1* | 11/2004 | Blevins | 717/107 |
| 2005/0216234 A1* | 9/2005 | Glas et al. | 702/186 |
| 2006/0058896 A1* | 3/2006 | Pokorny et al. | 700/19 |
| 2006/0146711 A1* | 7/2006 | Anbarani | 370/235 |
| 2007/0058651 A1* | 3/2007 | Bowen et al. | 370/412 |
| 2007/0088861 A1* | 4/2007 | Dudley et al. | 710/15 |
| 2007/0240168 A1* | 10/2007 | Guschina et al. | 719/318 |
| 2007/0299980 A1* | 12/2007 | Amini et al. | 709/231 |
| 2008/0243463 A1* | 10/2008 | Lovas et al. | 703/17 |
| 2009/0007111 A1* | 1/2009 | Nelson et al. | 718/1 |
| 2009/0122706 A1* | 5/2009 | Alfano et al. | 370/237 |
| 2010/0005468 A1* | 1/2010 | Chang et al. | 718/102 |

OTHER PUBLICATIONS

Jboss Enterprise SOA Platform, www.redhat.com/jboss, 2007, 5 pgs.
Jboss ESB 4.4 GA, Getting Started With Jboss ESB, JBESB-GS—Aug. 5, 2008, 13 pgs.
Jboss ESB, What is an ESB?, http://www.jboss.org/jbossesb/resources/WhatIsAnESB.html, Dec. 16, 2008, 2 pgs.

\* cited by examiner

*Primary Examiner* — Shih-Wei Kraft
(74) *Attorney, Agent, or Firm* — Lowenstein Sandler LLP

(57) ABSTRACT

A method and apparatus for regulating the input speed of events to an event processing system. In one embodiment, the method includes measuring a rate of events being outputted by the event processing system and computing an event transmission rate to be used to transmit received events to the event processing system based on the measured rate of events. The method further includes receiving an event with a speed controller to be processed by the event processing system and transmitting the received event by the speed controller to the event processing system according to the computed event transmission rate.

8 Claims, 9 Drawing Sheets

US 10,185,646 B2

GETTING PERFORMANCE SATURATION POINT OF AN EVENT DRIVEN SYSTEM

TECHNICAL FIELD

Embodiments of the present invention relate to processing events, and more specifically to adjusting the rate of processing events.

BACKGROUND

Computer system manufacturers typically test an event processing server by sending tens, hundreds, thousands, or more events from various sources. The event processing server receives these multitude of events and processes the received events. One type of testing is to saturate the target server under a steady stream of events so that the tested server is consistently processing these events over a long period of time. This type of testing is useful to discover long term problems of the server under test.

One way to accomplish this type of testing is to have several testing clients sending events to the tested server. In this arrangement, multiple internal and/or external testing clients transmit events to the tested server at a rate to saturate this server. However, due to network congestion issues and other problems (variable load of the servers under the test, the number of clients sending the events, etc.), the input speed of events into the tested server can fluctuate, so that the tested server is not consistently tested under saturation.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for controlling the input speed of events transmitted to an event processing system. In particular, in one embodiment, a speed controller receives the events to be processed by the event processing system and transmitting these received events based on an input speed determined from performance parameter(s) of the event processing system. The speed controller adjusts a current input speed based on the output speed of the event processing system and the number of events being processed by the event processing system.

In one embodiment, the speed controller decreases the input speed, if the input speed is greater than the output speed. Conversely, the speed controller increases the input speed if the input speed is less than the output speed. The speed controller receives measurement of the output speed from the event processing system or some other device (event repository, network device, etc.).

In another embodiment, speed controller starts to increase the input speed by an acceleration factor a if the number of events being processed falls below a specified minimum number of events. Furthermore, the speed controller ceases increasing the input speed by the acceleration factor if the number of events being processed is greater than a specified maximum number of events.

Figure 1:
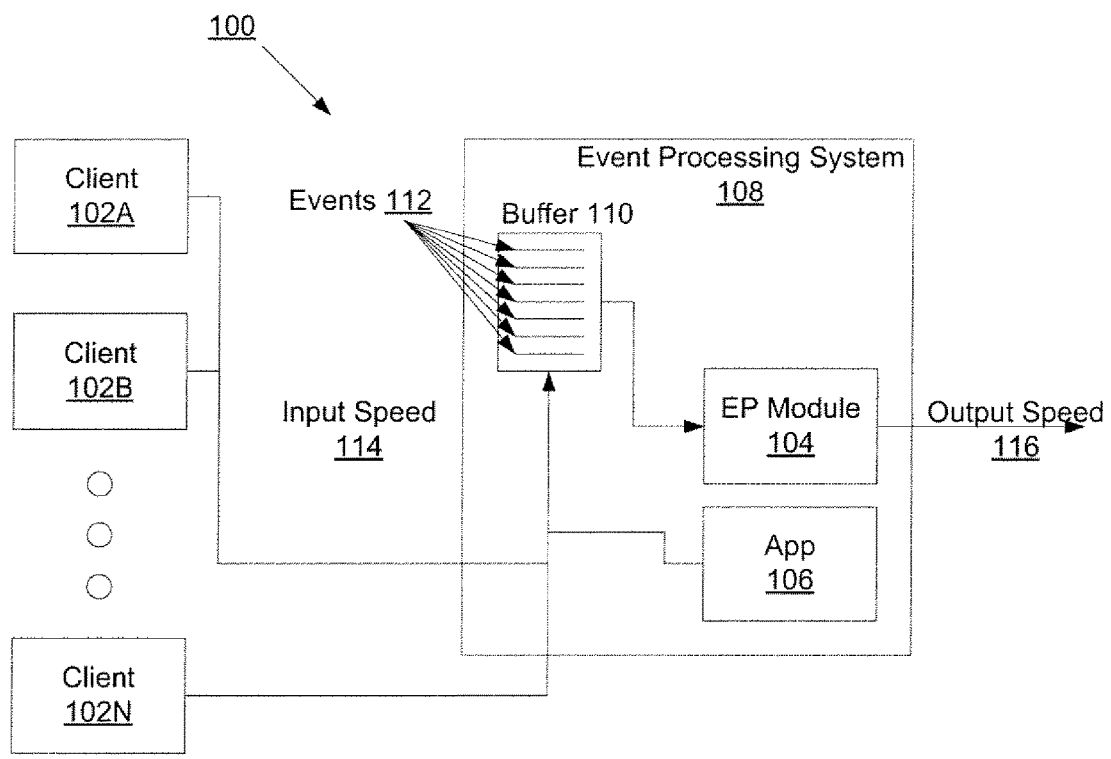
FIG. 1 is a block diagram of an exemplary event processing system.

FIG. 1 is a block diagram 100 of an exemplary event processing system 108 that processes events from internal and external event generating clients In FIG. 1, event processing system 108 receives events from multiple sources: external clients 102A-N and/or application 106 running on event processing system 108. The events processed by event processing system 108 can be, for example, extensible Markup Language (XML), an arbitrary binary event known in the art, etc. and/or combination thereof. Event processing system 108 comprises event processing module 104 and optionally application 106. Event processing module 104 receives the sent events and processes the received event. While in one embodiment, event processing module 104 transforms events in alternate embodiments, event processing module does some other event processing (enriching events, storing events, performing bookkeeping events, aggregating message parts of events, etc. In one embodiment, event processing system 108 is a JBOSS Enterprise™ server from JBOSS™, a division of RED HAT™, Incorporated of Raleigh, N.C.

Event processing system 108 receives the transmitted events and stores these events 112 in buffer 110. Events 112 come into event processing system 108 at an input speed 114 determined by clients 102 A-N and/or application 106. Event processing module 104 processes the buffered events 112 by retrieving events 112 from the buffer, processing these events, and outputting the events. Event processing module 104 outputs the processed events at a speed 116 that the event processing system 108 can support. Output speed 116 depends on the nature of the event processing, the physical resources of the event processing system and other factors that can generally affect the processing speed of a computer.

The input speed 114 of events flowing into event processing system 108 can fluctuate over time due to various factors. One way to mitigate this problem is to have a speed controller that controls the input speed of events from the various testing clients to the event processing system.

Figure 2A:
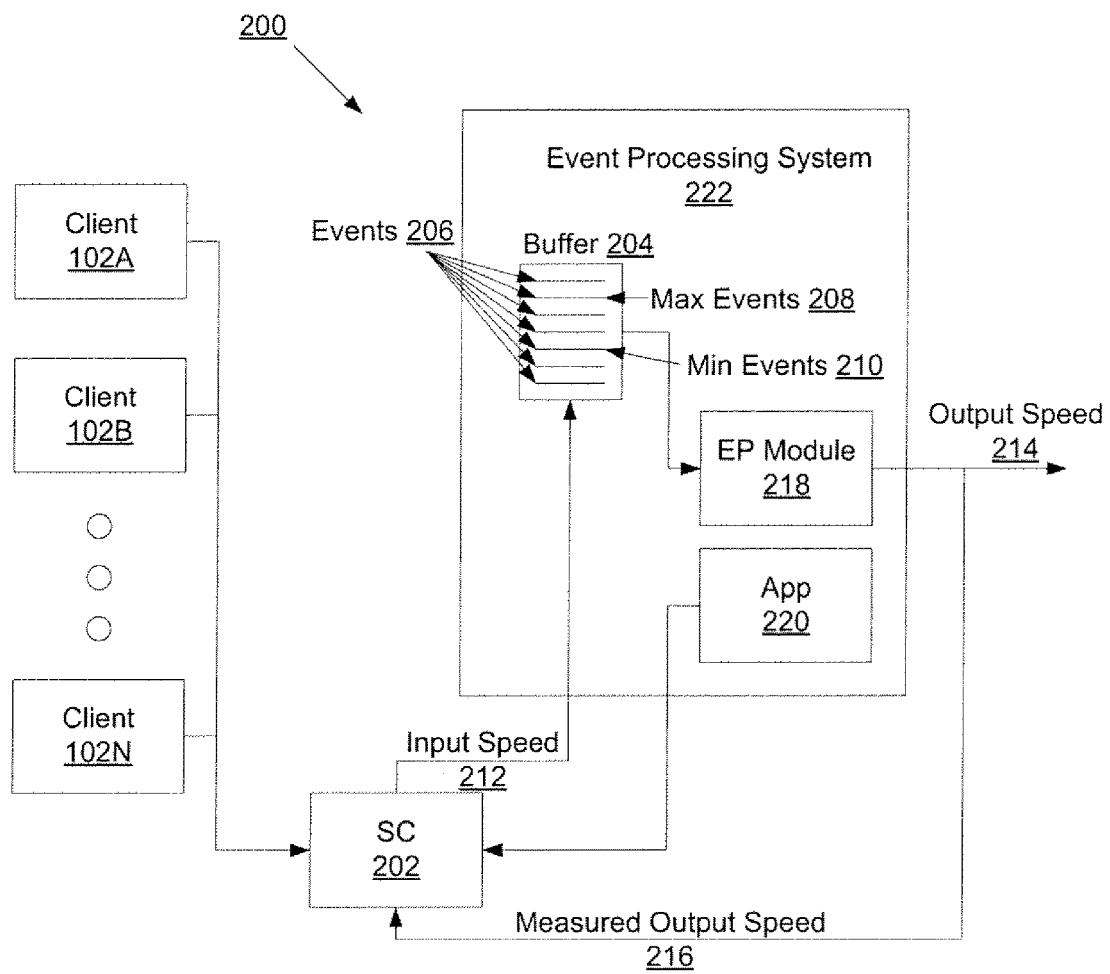
FIG. 2AB are block diagrams of one embodiment of a speed controller controlling the processing of events by the event processing systems.
Figure 2B:
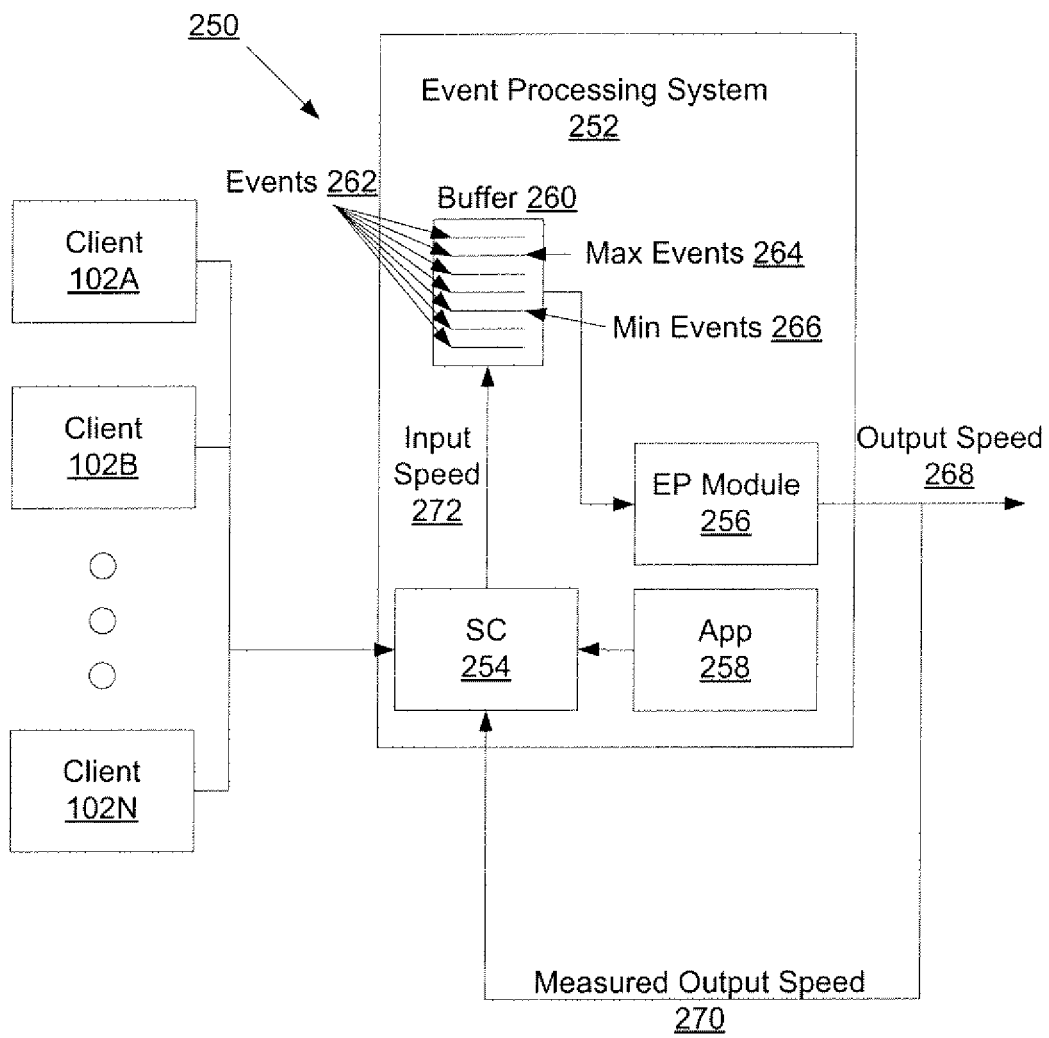

FIGS. 2A and 2B are block diagrams 200, 250 of one embodiment of speed controllers 202, 254 that control the input speed of events to the respective event processing systems. In FIG. 2A and in one embodiment, clients 102A-N and/or application 220 send events to be processed by event processing system 222. In this embodiment, event processing system 222 comprises event processing module 218, application 220, and buffer 204. Event processing module 218 processes the received events and forwards the processed events to other systems and/or modules at a rate of output speed 214. Buffer 204 stores the events waiting to be processed by event processing module 218. Instead of event processing system 222 directly receiving the events sent by clients 102A-N and/or application 220 as in FIG. 1, clients 102A-N and/or application 220 send these events to speed controller 202. Speed controller 202 regulates the flow of events to event processing system 222. In one embodiment, speed controller 202 buffers and transmits the received events at an input speed 212 to event processing system 222. In one embodiment, buffer 204 comprises memory. Furthermore, in one embodiment, speed controller 202 comprises a buffer (not shown) that includes memory to store the received events.

In one embodiment, the input speed 212 is based on the number of events currently being processed by event processing system 222 and the output speed 214 of events exiting event processing system 222. In this embodiment, speed controller 202 periodically adjusts the input speed in order to keep the flow of events at relatively consistent rate to saturate the event processing system 222 over a period of time. In one embodiment, event processing system 222 measures and reports the output speed 214 as measured output speed 216 to speed controller 202. In another embodiment, an external device (not shown) measures and reports the output speed 214 as measured output speed 216 to speed controller 202, such as an event repository, network devices, etc. In one embodiment, event processing system 222 monitors the number of events 206 in buffer 204 and reports this as the number of events currently being processed to speed controller 202. In a further embodiment, speed controller 202 adjusts the input speed based on the number of events being processed by event processing system 222 as well as a maximum 208 and minimum 210 number of events to be processed by event processing system 222. In one embodiment, the maximum 208 number of events is the desired maximum number of events currently that can be processed by event processing system 222. The number of events being processed can be above or below this maximum. As described below, if the number of events is greater than maximum 208, speed controller 202 can adjust input speed 212. In another embodiment, minimum 210 number of events is the desired minimum number of events that can be being processed by event processing system 222. The number of events being processed can be above or below this minimum. As described below, if the number of events is lower than minimum 210, speed controller 202 can adjust input speed 212.

In an alternative embodiment, the speed controller can be a module of event processing system. In FIG. 2B, clients 102A-N and/or application 258 transmit events to speed controller 254, where speed controller is a module of event processing system 252. In this embodiment, event processing system 252 comprises event processing module 256, application 258, speed controller 254 and buffer 260. In this embodiment, speed controller 254 transmits the received events to buffer 260 at input speed 272. As in FIG. 2A, in one embodiment, input speed 272 is based on the number of events currently being processed by event processing system 252 and the output speed 268 of events (e.g., measured output speed 270) exiting event processing system 252. Furthermore, in another embodiment, input speed 272 is further based one maximum 264 and minimum 266 events stored in buffer 260. In one embodiment, buffer 260 comprises memory.

Figure 3:
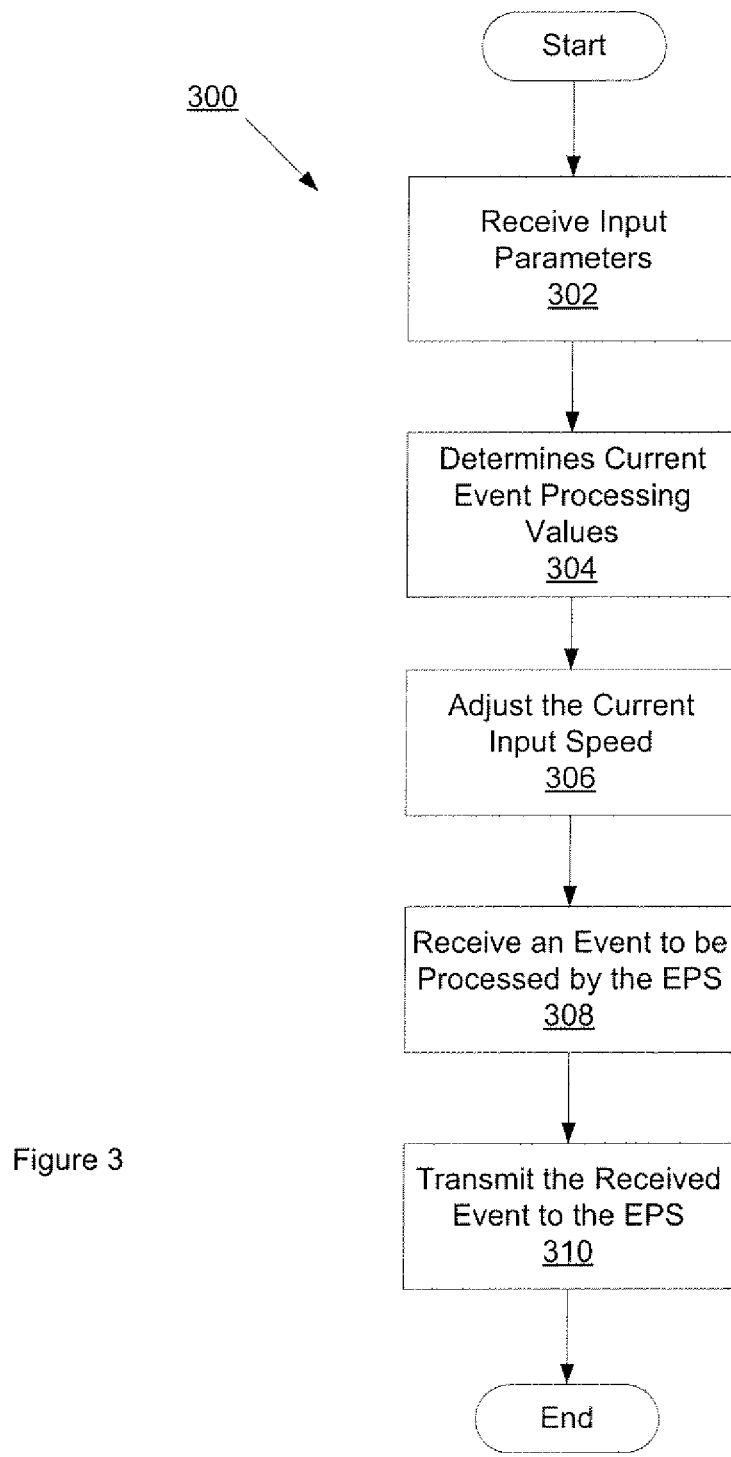
FIG. 3 is a flow diagram of one embodiment of a method for controlling the speed of events being transmitted to the event processing system.

FIG. 3 is a flow diagram of one embodiment of a method 300 for controlling the speed of events being transmitted to the event processing system. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a speed controller, such as speed controller 202 of FIG. 2A or speed controller 254 of FIG. 2B.

Referring to FIG. 3, method 300 begins with processing logic receiving input parameters used to determine the event transmission rate (block 302). In one embodiment, method 300 receives maximum output speed, maximum event, and minimum event parameters. Maximum output speed signifies the maximum number of events that should be transmitted to the events processing system. Minimum and maximum events are the minimum and maximum number of events that are currently being processed by the event processing system.

At block 304, method 300 determines the current event processing values such as the current input speed, current output speed, and the number of events currently being processed by the event processing system. In one embodiment, method 300 uses a recently adjusted input speed, a requested input speed, random setting, etc. as the current input speed. In one embodiment, method 300 receives the output speed from the event processing system or another device as described above in FIG. 2A or 2B. In one embodiment, method 300 measures the number of events being processed over a given time period.

At block 306, method 300 adjusts the current input speed. In one embodiment, method 300 adjusts the current input speed based on the control parameters (maximum event output speed, minimum events, and maximum events) and the current speed controller event measured values (current events being processed, current input speed, and output speed). In one embodiment, method 300 increases the current input speed if the current input speed is less than the output speed. In another embodiment, method 300 decreases the current input speed if the current input speed is greater than the current output speed. In yet another embodiment, method 300 starts to multiply the adjusted requested input speed by an acceleration factor a if the number of events currently being processed is greater than maximum number of events that can be processed by the event processing system. In a further embodiments method 300 stops the multiplication of the adjusted requested input speed by the factor a if the number of events currently being processed is less than or equals to a minimum number of events that can be processed by the event processing system. While in one embodiment, the factor a has a value of two, in alternate embodiments, this factor is set experimentally (observing the performance of the event processing system, network conditions, client capability, etc.). Adjusting the current event input rate is further described in FIG. 4 below.

At block 308, method 300 receives an event to be processed by the event processing system. Method 300 transmits the received event according to the adjusted input speed to the event processing system at block 310.

Figure 4:
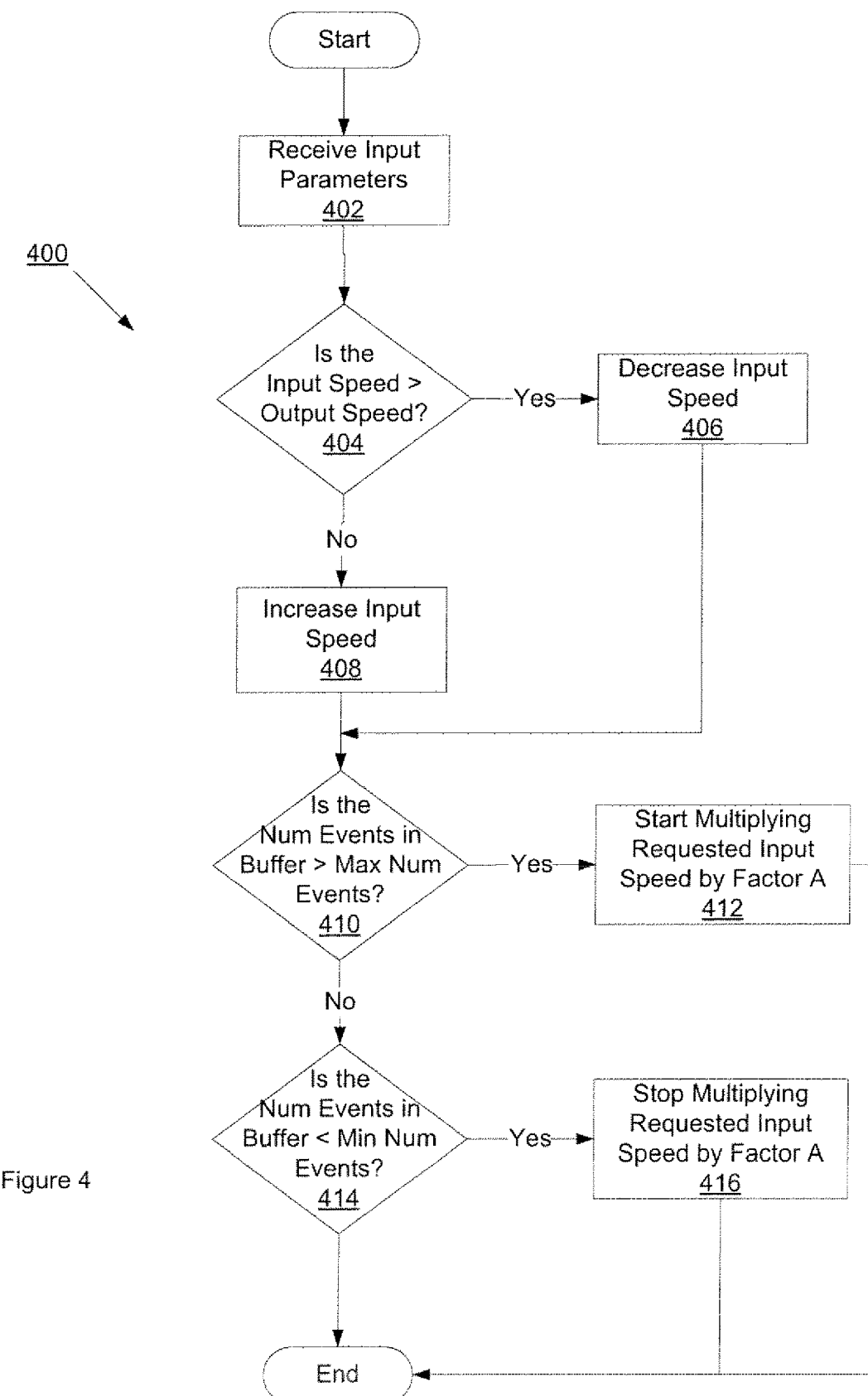
FIG. 4 is a flow diagram of one embodiment of a method for adjusting the current input speed.

FIG. 4 is a flow diagram of one embodiment of a method 400 for adjusting the current input speed as described in FIG. 3, block 306. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a speed controller, such as speed controller 202 of FIG. 2A or speed controller 254 of FIG. 2B.

Referring to FIG. 4, method 400 begins with processing logic receiving input parameters. In one embodiment, method 400 receives current input speed, current output speed, number of event currently being processed by the event processing system, minimum number of events in the event processing system, maximum number of events in the event processing system, and the acceleration factor, a.

At block 404, method 400 determines if the current event input speed is greater than the desired event output speed. If so, method 400 decreases the input speed by setting the current event input speed to the desired output speed at block 406. In one embodiment, method 400 decreases the input speed by increasing the pause between transmitted events. With the adjusted current input speed, method 400 computes a delay that is used to transmit the events using Eq. (1):

$$t_D = (1/V_{IR}) - (1/V_1) \quad (1)$$

where $t_D$ is the computed event transmission delay change, $V_{IR}$ is the adjusted input speed and $V_1$ is the current input speed. Method 400 computes the new delay according to Eq. (2):

$$d_N = d + t_D, \text{ if } d<0, \text{ set } d=0. \quad (2)$$

where $d_N$ is the new delay, d is the current delay, and $t_D$ is the computed event delay change. According to Eq. (2), method 400 sets the new delay to zero if the new computed delay is less than zero. By setting the new delay to zero, method 400 runs at maximum speed and transmits events as fast as method 400 receives the events and/or is possible given the computational resources that method 400 is using.

If method 400 determines that the current event speed is not greater than the desired output speed, method 400 increases the current event input speed at block 408. In one embodiment, method 400 adjusts the current input speed to be equal to the desired output speed times an acceleration factor a. In one embodiment, method 400 sets the current input speed to the desired output speed using Eq. (1) above. In this embodiment, as $t_D$ increases or decreases, the current input speed decreases or increases, respectively. In one embodiment, using the adjusted input speed, method 400 computes an event transmission delay change and new delay according to Eqs. (1) and (2).

At block 410, method 410 determines if the number of events in the buffer of the event processing system is greater than a maximum number of events. If so, method starts multiplying the requested input speed by an acceleration factor, a, at block 412. If method 400 determines that the number of events in the buffer of the event processing system is not greater than a maximum number of events, method 400 determines if the number of events in the buffer of the event processing system is less than a maximum number of events at block 414. If so, method 400 stops multiplying the requested input speed by the acceleration factor, a, at block 416. In one embodiment, by stopping and starting the accelerator factor multiplication, method 400 can avoid the input speed be situated in a local minima.

Figure 5:
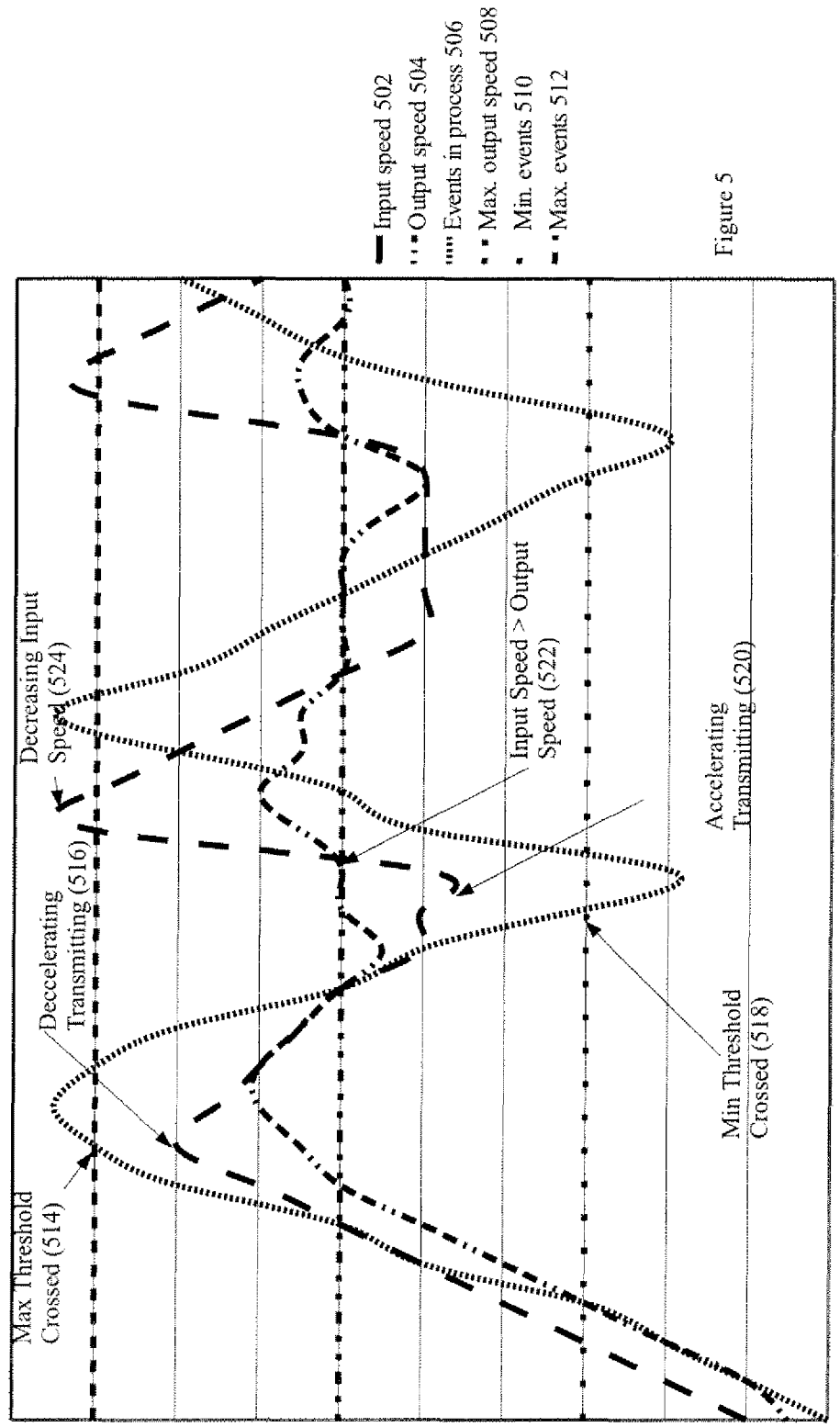
FIG. 5 is a diagram of one embodiment of speed regulation curves for controlling events to be processed by the event processing system.

As described above, method 300 and 400 periodically adjust the current input speed based on the output speed and the number of events in the event processing system. In one embodiment, because the input speed is adjusted based on values that can fluctuate over time, the adjusted input speed can fluctuate as well. FIG. 5 is a diagram of one embodiment of parameter curves parameter curves used by the speed controller reflecting the data in exemplary Table 1 below.

TABLE 1

Speed Controller Parameter Values over Time

| Time | Input Speed 502 | Output Speed 504 | Events in Process 506 | Max. Output Speed 508 | Min. Events 510 | Max. Events 512 |
|---|---|---|---|---|---|---|
| 0 | 1 | 0.5 | 0 | 6 | 3 | 9 |
| 1 | 2 | 1 | 1 | 6 | 3 | 9 |
| 2 | 3 | 2 | 2 | 6 | 3 | 9 |
| 3 | 4 | 3 | 3 | 6 | 3 | 9 |
| 4 | 5 | 4 | 5 | 6 | 3 | 9 |
| 5 | 6 | 5 | 6 | 6 | 3 | 9 |
| 6 | 7 | 6 | 8 | 6 | 3 | 9 |
| 7 | 8 | 6.5 | 9 | 6 | 3 | 9 |
| 8 | 7.5 | 7 | 9.5 | 6 | 3 | 9 |
| 9 | 7 | 7 | 9 | 6 | 3 | 9 |
| 10 | 6.5 | 6.5 | 8 | 6 | 3 | 9 |
| 11 | 6 | 6 | 6 | 6 | 3 | 9 |
| 12 | 5 | 5.5 | 5 | 6 | 3 | 9 |
| 13 | 5 | 6 | 3 | 6 | 3 | 9 |
| 14 | 5 | 6 | 2 | 6 | 3 | 9 |
| 15 | 9 | 6.5 | 5 | 6 | 3 | 9 |
| 16 | 9 | 7 | 6 | 6 | 3 | 9 |
| 17 | 8 | 6.5 | 8 | 6 | 3 | 9 |
| 18 | 7 | 6.5 | 9.5 | 6 | 3 | 9 |
| 19 | 6 | 6 | 8 | 6 | 3 | 9 |
| 20 | 5 | 6 | 7 | 6 | 3 | 9 |
| 21 | 5 | 6 | 6 | 6 | 3 | 9 |
| 22 | 5 | 6 | 5 | 6 | 3 | 9 |
| 23 | 5 | 5.5 | 4 | 6 | 3 | 9 |
| 24 | 5 | 5 | 3 | 6 | 3 | 9 |
| 25 | 6 | 6 | 2 | 6 | 3 | 9 |
| 26 | 9 | 6.5 | 4 | 6 | 3 | 9 |
| 27 | 9 | 6.5 | 6 | 6 | 3 | 9 |
| 28 | 8 | 6 | 7 | 6 | 3 | 9 |
| 29 | 7 | 6 | 8 | 6 | 3 | 9 |

In FIG. 5, constants curves 508, 510, and 512 represent the maximum output speed of the speed controller, the minimum number of events being processed in the event processing system, and the maximum number of events being processed in the event processing system, respectively. In one embodiment, these constant values represent trigger point which can cause methods 300 and/or 400 to adjust the current input speed. Curves 502, 504, and 506 represent the fluctuation of parameters for input speed, output speed, and event being processed over time. In one embodiment, curves 504 and 506 are dependent on the number of events filling the buffer of the event processing system (e.g., input speed) and the computational resources of the event processing system. The input speed curve 502 changes in response to the output speed and events being processed parameters as the input speed in dependent on these parameters. For example, when the number of events being processed crosses the maximum number of events 514, the speed controller decelerates transmission 516 of the events by reducing the input speed. In one embodiment, the speed controller decelerates the event transmission as described in FIG. 4, blocks 410, 412, 414, and 416. As another example, when the number of events being processed crosses the minimum number of events 518, the speed controller accelerates transmission 520 of the events by increasing the input speed. In one embodiment, the speed controller decelerates the event transmission as described in FIG. 4, blocks 410, 412, 414, and 416. As a further example, when the input speed crosses the output speed 522, the input speed eventually decreases 524 because the input speed is greater than the output speed as described in FIG. 4, blocks 404, 406, and 408. In this example, the input speed does not immediately decrease because the factor a is also being applied to the input speed which increases the input speed.

Figure 6:
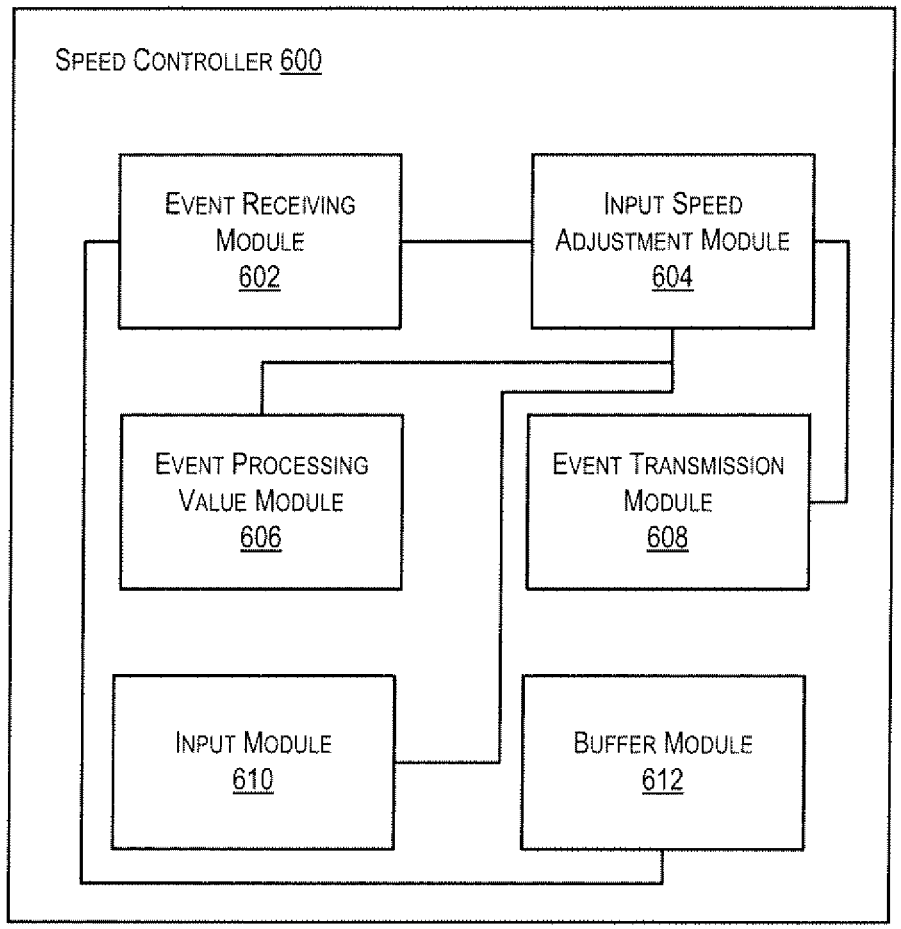
FIG. 6 is a block diagram of a speed controller that regulates the speed of events to the event processing system.

FIG. 6 is a block diagram of a speed controller 600 that regulates the speed of events to the event processing system. In one embodiment, speed controller 600 is a stand alone device as described in FIG. 2A above. In an alternate device, speed controller 600 is a speed controller module in an event processing system as described in FIG. 2B. In FIG. 6, speed controller 600 comprises event receiving module 602, input speed adjustment module 604, event processing value module 606, event transmission module 608, input module 610, and buffer 612. Event receiving module 602 receives the events as described in FIG. 3, block 308. Input speed adjustment module 604 adjusts the current input speed as described in FIG. 3, block 306. Event processing value module 606 determines that number of events currently being processed as described in FIG. 3, block 304. Event transmission module 608 transmits the received event according to the adjusted input speed as described in FIG. 3, block 310. In one embodiment, event transmission module 608 include transmission hardware that is used to transmit the received events over a wired or wireless network. Input module 610 receives the maximum output speed, maximum event, and minimum event parameters as described in FIG. 3, block 302. Buffer 612 stores the received events. In one embodiment, buffer 612 includes memory for the stored events and event transmission module 608 retrieves the stored events from the memory for transmission.

Figure 7:
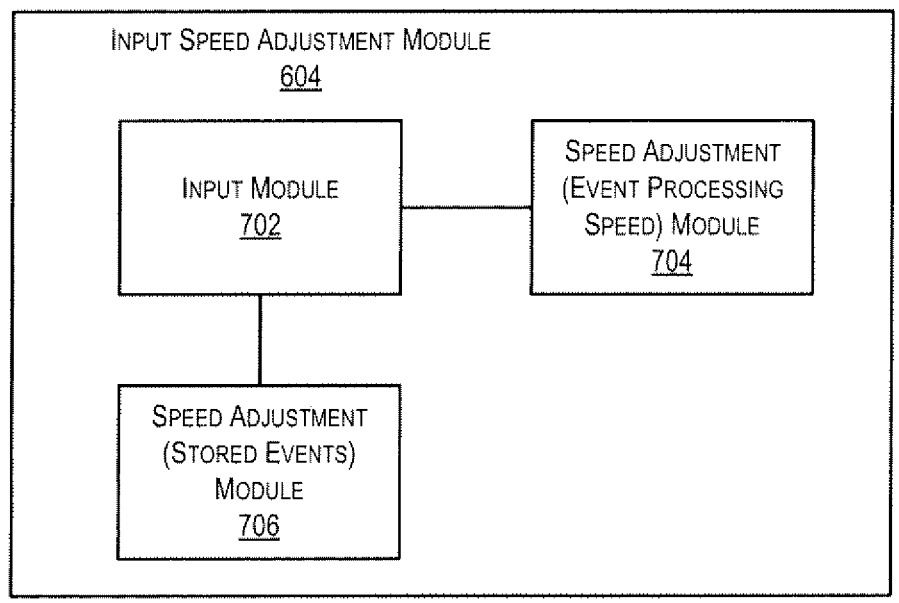
FIG. 7 is a block diagram of an event transmission rate module that determines the event regulation speed.

FIG. 7 is a block diagram of the input speed adjustment module 604 that adjusts the input speed. In one embodiment, input speed adjustment module 604 is part of speed controller 600. Input speed adjustment module 604 comprises input module 702, speed adjustment (event processing speed) module 704 and speed adjustment (stored events) module 706. Input module 702 receives the input parameters for input speed adjustment module 604 as described in FIG. 4, block 402. Speed adjustment (event processing speed) module 704 adjusts the current input speed based on the input/output speeds of the speed controller as described in FIG. 4, block 404, 406, and 408. Speed adjustment (stored events) module 704 adjusts the current input speed based on the number of events current being processed by the event processing system as described in FIG. 4, blocks 410, 412, 414, and 416.

Figure 8:
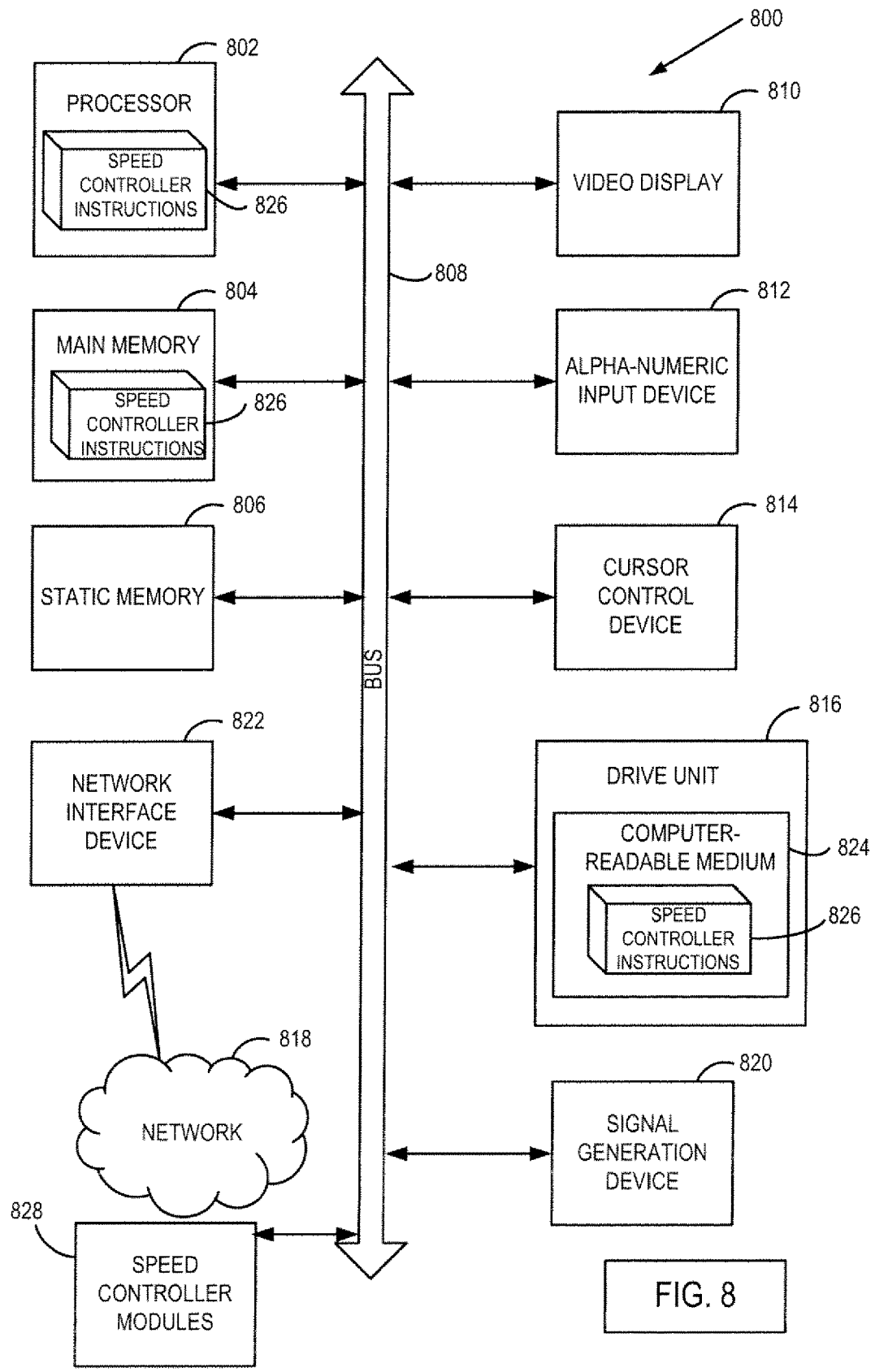
FIG. 8 illustrates a diagrammatic representation of a machine in the exemplary form of a speed controller, in accordance with one embodiment of the present invention.

FIG. 8 is a diagram of one embodiment of a speed controller system for controlling the input speed of events transmitted to the event processing system. Within the speed controller system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer sending events to the event processing system and the server computer receiving events from clients sending the events) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary speed controller system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the speed controller instructions 826 for performing the operations and steps discussed herein.

The speed controller system 800 may further include a network interface device 822. The speed controller system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the speed controller instructions 826) embodying any one or more of the methodologies or functions described herein. The speed controller instructions 826 may also reside, completely or at least partially, within the main memory 804 and/or within the processing device 802 during execution thereof by the speed controller system 800, the main memory 804 and the processing device 802 also constituting machine-readable storage media. The speed controller instructions 826 may further be transmitted or received over a network 818 via the network interface device 822.

The computer-readable storage medium 824 may also be used to store the speed controller instructions 826 persistently. While the computer-readable storage medium 826 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein (for example in relation to FIG. 1) can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "computing," "increasing," "decreasing," "increasing," "creating ceasing," "transmitting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for controlling the speed of events transmitted to the event processing system has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a first control parameter comprising a minimum threshold number of events being processed by an event processing system;
   receiving a second control parameter comprising a maximum threshold number of events being processed by the event processing system;
   determining a current input speed of a plurality of events transmitted to the event processing system;
   setting a factor for adjusting the current input speed;
   setting, by a controller, an adjusted input speed in view of the first and second control parameters, wherein to set the adjusted input speed, the controller monitors a number of events being processed by the event processing system to maintain a flow of events to saturate the event processing system, and wherein the controller:
   increases the current input speed by the factor responsive to determining the number of events in process in the event processing system is less than the minimum threshold number of events for the event processing system; and decreases the current input speed by the factor responsive to determining the number of events in process in the event processing system is greater than the maximum threshold number of events for the event processing system;

storing, in a first buffer associated with the controller, a first set of events received from a plurality of client systems; and transmitting, from the first buffer of the controller, the first set of events to a second buffer of the event processing system at the adjusted input speed.

2. The method of claim 1, further comprising: storing the first set of events in the second buffer associated with the event processing system.

3. The method of claim 1, wherein the first set of events comprises an extended markup language event.

4. The method of claim 1, wherein the event processing system comprises a server used to process the first set of events over a period of time.

5. A non-transitory computer readable storage medium comprising instructions that, when executed by a controller, cause the controller to:

receive a first control parameter comprising a minimum threshold number of events being processed by an event processing system;

receive a second control parameter comprising a maximum threshold number of events being processed by the event processing system;

determine a current input speed of a plurality of events transmitted to the event processing system;

set a factor for adjusting the current input speed;

set, by the controller, an adjusted input speed in view of the first and second control parameters, wherein to set the adjusted input speed, the controller is to monitor a number of events being processed by the event processing system to maintain a flow of events to saturate the event processing system, and:

increase the current input speed by the factor responsive to determining a number of events in process in the event processing system is less than the minimum threshold number of events being processed by the event processing system; and decrease the current input speed by the factor responsive to determining the number of events in process in the event processing system is greater than the maximum threshold number of events being processed by the event processing system;

store, in a first buffer associated with the controller, a first set of events received from a plurality of client systems; and transmit, from the first buffer of the controller, the first set of events to a second buffer of the event processing system at the adjusted input speed.

6. The non-transitory computer readable storage medium of claim 5, wherein the second buffer stores the first set of events received from the first buffer of the controller.

7. The non-transitory computer readable storage medium of claim 5, wherein the event is an extended markup language event.

8. A system comprising:
a memory; and
a controller, operatively coupled to the memory, the controller to:

receive a first control parameter comprising a minimum threshold number of events being processed by an event processing system;

receive a second control parameter comprising a maximum threshold number of events being processed by the event processing system;

determine a current input speed of a plurality of events transmitted to the event processing system;

set a factor for adjusting the current input speed;

adjust the current input speed in view of the first and second control parameters, wherein to adjust the current input speed, the controller is to monitor a number of events being processed by the event processing system to maintain a flow of events to saturate the event processing system and:

increase the current input speed by the factor responsive to determining a number of events in process in the event processing system is less than the minimum threshold number of events being processed by the event processing system; and decrease the current input speed by the factor responsive to determining the number of events in process in the event processing system is greater than the maximum threshold number of events being processed by the event processing system;

receive an event, the event to be processed by the event processing system; and transmit the event to the event processing system at the current input speed.

* * * * *